US007871552B2

(12) United States Patent
Srostlik et al.

(10) Patent No.: US 7,871,552 B2
(45) Date of Patent: Jan. 18, 2011

(54) DEVICE AND METHOD FOR THE PRODUCTION OF A ROOF TILE WITH AT LEAST ONE WATER BARRIER

(75) Inventors: Peter Srostlik, Maintal (DE); Andrea Hensel, Roedermark (DE)

(73) Assignee: Monier Technical Centre GmbH (DE)

( * ) Notice: Subject to any disclaimer, the term of this patent is extended or adjusted under 35 U.S.C. 154(b) by 0 days.

(21) Appl. No.: 12/295,830

(22) PCT Filed: Aug. 10, 2007

(86) PCT No.: PCT/EP2007/058341
§ 371 (c)(1), (2), (4) Date: Oct. 2, 2008

(87) PCT Pub. No.: WO2008/037540
PCT Pub. Date: Apr. 3, 2008

(65) Prior Publication Data
US 2009/0160085 A1 Jun. 25, 2009

(30) Foreign Application Priority Data
Sep. 30, 2006 (DE) ....................... 10 2006 046 588

(51) Int. Cl.
*B29C 65/00* (2006.01)

(52) U.S. Cl. .................... 264/271.1; 264/249; 425/112; 425/445; 425/517

(58) Field of Classification Search ................. 264/249, 264/271.1; 425/517, 112, 445; 414/222.01, 414/222.07, 222.12, 226.01, 226.02, 226.05
See application file for complete search history.

(56) References Cited

U.S. PATENT DOCUMENTS 5,072,575 A * 12/1991 Lakey ......................... 53/450

FOREIGN PATENT DOCUMENTS

| | | |
|---|---|---|
| AT | E 27 842 | 4/1985 |
| DE | 1 838 431 | 9/1961 |
| DE | 1 126 791 | 10/1962 |
| DE | 1 812 456 | 8/1969 |

(Continued)

OTHER PUBLICATIONS

Derwent Abstract of SU 1423371, 1989, retrieved Mar. 10, 2010.*

(Continued)

*Primary Examiner*—Joseph S Del Sole
*Assistant Examiner*—Timothy Kennedy
(74) *Attorney, Agent, or Firm*—Ostrolenk Faber LLP

(57) ABSTRACT

The invention relates to an arrangement and a method for providing a roof tile with at least one water stop. With the arrangement it becomes possible to press a water stop, comprised of a material differing from that of the roof tile, into a roof tile blank. After the water stop has been pressed in, it is partially disposed with its edge in the material of the roof tile blank in the proximity of the watercourse, of the central brim and of the lateral beading.

33 Claims, 3 Drawing Sheets

FOREIGN PATENT DOCUMENTS

Figure 1:
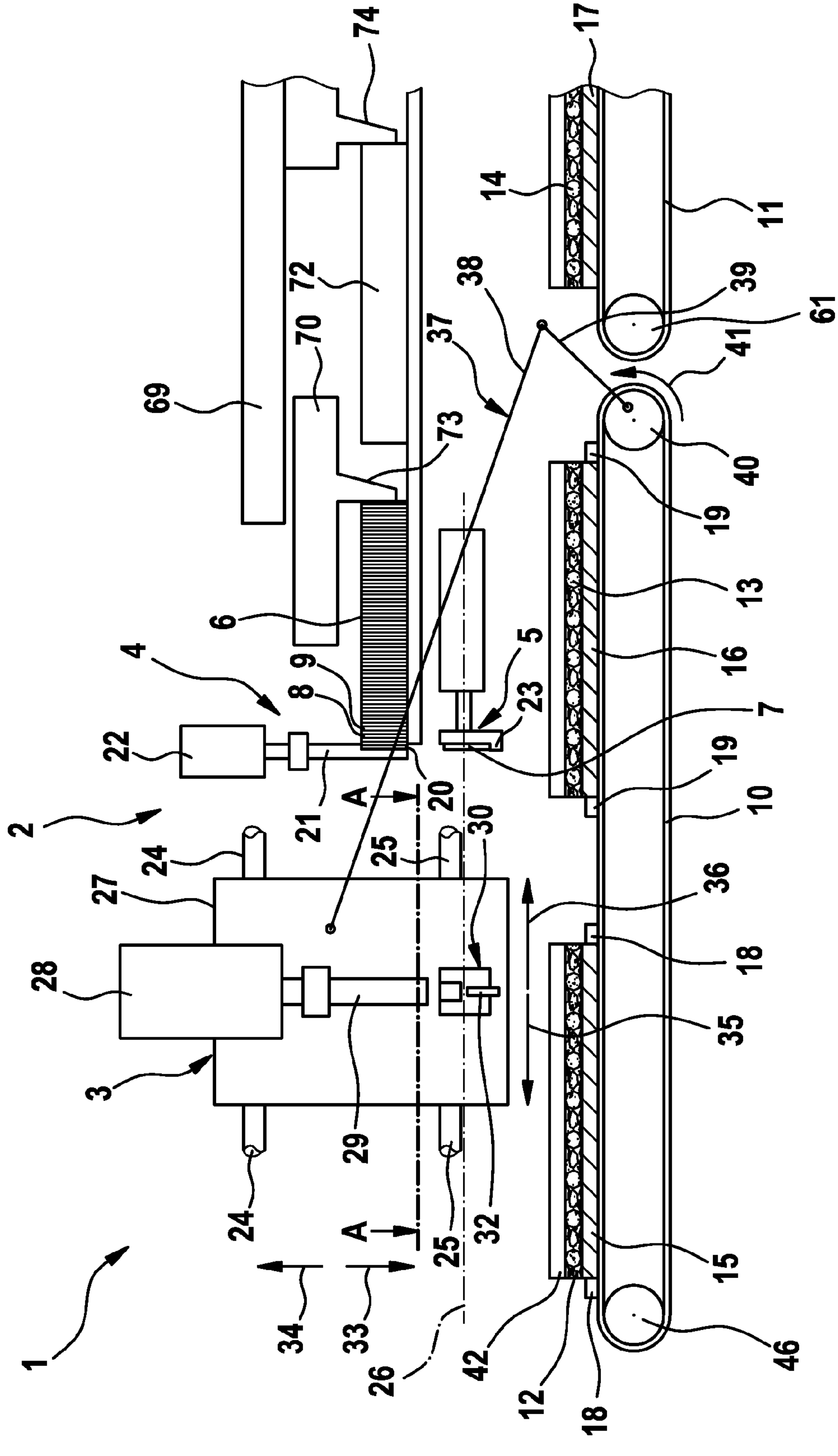

| | | | |
|---|---|---|---|
| DE | 22 52 047 | | 5/1973 |
| DE | 25 08 551 | | 3/1976 |
| DE | 35 22 846 | | 1/1987 |
| DE | 297 05 738 | | 8/1997 |
| GB | 664010 | | 1/1952 |
| RU | 2 099 489 | C1 | 12/1997 |
| RU | 50234 | U1 | 12/2005 |
| SU | 1423371 | A * | 9/1988 |

OTHER PUBLICATIONS

Written Opinion with English Language Translation.
International Search Report with English Language Translation.
International Preliminary Report on Patentability.

* cited by examiner

DEVICE AND METHOD FOR THE PRODUCTION OF A ROOF TILE WITH AT LEAST ONE WATER BARRIER

The invention relates to an arrangement for the production of a roof tile with at least one water stop according to the preamble of patent claim 1 as well as a method for the production of such roof tiles according to the preamble of patent claim 22.

In the production of roof tiles according to the extrusion method onto a strand or extrusion line of abutting subforms of equal length delivered at constant speed is applied a green concrete layer as an endless band, which is shaped on the top side by forming tools corresponding to the surface contour conventional for roof tiles. The continuously applied green concrete layer is subsequently cut by means of a cutting tool developed as a blade at each end of each subform in a cutting station, such that each subform carries a single roof tile blank (DE 35 22 846 A1 and DE 22 52 047 C3).

In DE 35 22 846 A1 the additional measure is taken that the roof tile blank disposed on its subform is subsequently cured in a drying chamber and, after it is cured, is provided with a surface coating.

Known is a cleaning roof slab with metal particulates for keeping building roofs clean, in particular for preventing fouling, which are provided, in the direction of water drainage, at least in the lower region of the plate surface (DE 297 05 738 U1). These metal particulates are set in their upright position into the surface of the plate.

In order to roof a pitched roof with such roof tiles such that it is tight against driving rain, it is necessary that the roof tiles adjacent in a ridge-to-eaves line are placed such that they overlap. The particular length of overlap is herein dependent on the particular slope of the roof, i.e. in the case of a roof with very steep slope, the overlap can be less than in the case of a roof with very low slope.

However, construction measures have been taken in which the roof tile is provided on its underside at the foot-end margin with foot ribs extending transversely. The subforms known from DE 35 22 846 A1 are, for example, fitted out with recesses at their transverse margins, such that the green concrete pressed into these recesses forms suspension flanges at the head-end margin of the roof tile blank, and, at the foot-end margin, forms foot ribs extending transversely. In this way during the roofing the ridge-side roof tile can be hooked with its suspension flanges onto a roof batten and with its foot ribs be placed onto the surface of the roof tile adjacent in the direction of the eaves. Due to the foot ribs, in the region of overlap of the roof tiles a type of labyrinth is herein formed which counteracts the rain water from being driven into the roof.

However, the use of these roof tiles is problematic in the case of roofs having a slope of less than 22°, since, due to the low slope of the roof, a very large overlap length of the roof tiles is required. Between ridge and eaves, consequently, a very large number of parallel roof tile rows must be emplaced. Due to such large requirement of roof tiles and the preparation of a roof batten construction adapted to the number of roof tiles, the material and labor costs are considerably increased. Buildings with very low roof slopes are therefore frequently roofed with large-format, less expensive and lighter roofing materials, such as for example sheet metal or fiber-cement slabs.

A change has therefore taken place toward providing the roof tiles with a water stop on their top side in the region of their head-end margin, which stop prevents heavy rain from being driven into the roof. In this way the overlapping of the roof tiles can be markedly decreased, such that the material and labor costs are reduced.

Thus, a roof tile based on concrete or synthetic material is known in which transversely to the longitudinal direction, starting from the longitudinal beading, over and beyond the first corrugation trough and the first corrugation as well as over the second corrugation trough up to the level of the second corrugation, at a distance of the minimal coverage of the superjacent roof tile, a security dam is formed on against splashback water, driving rain or drifting snow (DE 1 838 431 U).

A roof slab is furthermore known with opposing side faces and with at least one sealing strip disposed on at least one side face of the slab and extending beyond it (AT 27 842 B). The slab is adapted such that it can be so disposed that it partially overlaps an adjoining slab and is itself partially overlapped by an adjoining slab, the roof beneath forming a repository and the strip being implemented such that it forms a barrier when clamped between the side surface of the roof slab and the opposing side surface of the adjoining roof slab. The sealing strip is formed of a strip of perpendicular synthetic fibers.

DE 18 12 456 A1 and DE 25 08 551 A1 describe methods suitable for providing the roof tile blank supported on their subforms with a water stop. In both methods, first, a water stop is formed from separately supplied green concrete, which water stop is subsequently pressed or adhered in the region of the head-end margin onto the top side of the roof tile blank. The water stop is herein relatively wide in order to ensure, on the one hand, sufficient dimensional stability and, on the other hand, a material closure connection over a large area.

However, the roof tiles fitted out according to the above methods with a water stop have the disadvantage that, due to the use of different green concretes, between the roof tile and the water stop a weakening joint site is formed, which is susceptible to impact and tends toward the development of cracks.

To eliminate this shortcoming, a change was proposed according to GB 664010 toward forming onto the head-end margin of the roof tile blank the water stop during the cutting of the green concrete strand into individual roof tile blanks. Roof tile blank and water stop are therefore comprised of the same green concrete. In this way a good connection between water stop and roof tile can be attained.

However, of disadvantage when forming the water stop directly onto the head-end margin of the roof tile blank is that the suspension flanges on the underside of the roof tile blank must be disposed at a distance from the head-end margin in order to ensure stackability of the roof tiles. For the production of roof tiles with a water stop according to GB 664010 a separate set of subforms is therefore required, and the spacing of the suspension flanges from the head-end margin leads to a considerable reduction of the cover length of the roof tiles.

The invention therefore addresses the problem of providing an arrangement as well as a method for inserting at least one water stop into a roof tile.

The problem is solved according to the features of patent claims 1 and 22.

The invention consequently relates to an arrangement and a method for providing a roof tile with at least one water stop. With the arrangement it becomes feasible to press a water stop comprised of a material differing from that of the roof tile into a roof tile blank. After it has been pressed in, the water stop is disposed in the proximity of the watercourse, of the central brim and of the lateral beading with its edges partially in the material of the roof tile blank.

According to the invention a water stop, implemented in the form of a small plate, is utilized which is pressed into the roof tile blank. The water stop herein partially penetrates with its edges in the proximity of the watercourse, of the central brim and the lateral beading into the compacted green concrete of the roof tile blank such that, after the roof tile blank has cured, the water stop is mechanically held by the encompassing concrete, whereby the reliable and permanent securement of the water stop is attained.

During the roofing, each of the water stops of the roof tiles are overlapped in an eaves-side row by the foot ribs of the roof tiles in a ridge-side row. The overlap of the roof tiles generated, herein depends, in addition to the roof slope, also on the width of the water stop. In comparison with DE 18 12 456 A1 and DE 25 08 551 A1, the undesirable overlap due to the water stop is minimized by implementing the water stop in the form of a small plate. The thickness of the material of the water stop should be less than 3 mm. However, since the water stop requires sufficient rigidity in order to be pressed into the compacted green concrete, the material thickness should be more than 0.25 mm. The water stop should further be produced of corrosion-resistant material.

In the method according to the invention, in contrast to GB 664010, the water stop is pressed in at a desired distance from the head-end margin of the roof tile blank, whereby the suspension flanges on the underside of the roof tile blank can retain their optimal position at the head-end margin, such that in the case of the roof tiles produced according to the invention the full cover length can be utilized. Since the roof tiles can be produced on conventional subforms, high investment costs become unnecessary and the method according to the invention can be optionally integrated into a roof tile ring.

The arrangement according to the invention can be disposed, for example, in a roof tile ring directly behind the roof tile machine, such that the subforms with the roof tile blanks supported thereon are supplied continuously. In this case the setting arrangement not only carries out a relative movement in the direction of the surface of the roof tile blank, but rather it is additionally moved at the same rate as the subforms and parallel to them. In this way the green concrete of the roof tile blank is not amassed while the water stop is pressed in, and a production cycle of more than 120 roof tiles per minute can be realized.

However, alternatively, the roof tile blanks can also be removed from the roof tile ring and be fed discontinuously to the arrangement according to the invention. In this case the roof tile blank is stopped beneath the setting arrangement, such that this setting arrangement only executes a setting movement in the direction of the surface of the roof tile blank during which the water stop is pressed into the green concrete.

Figure 2:
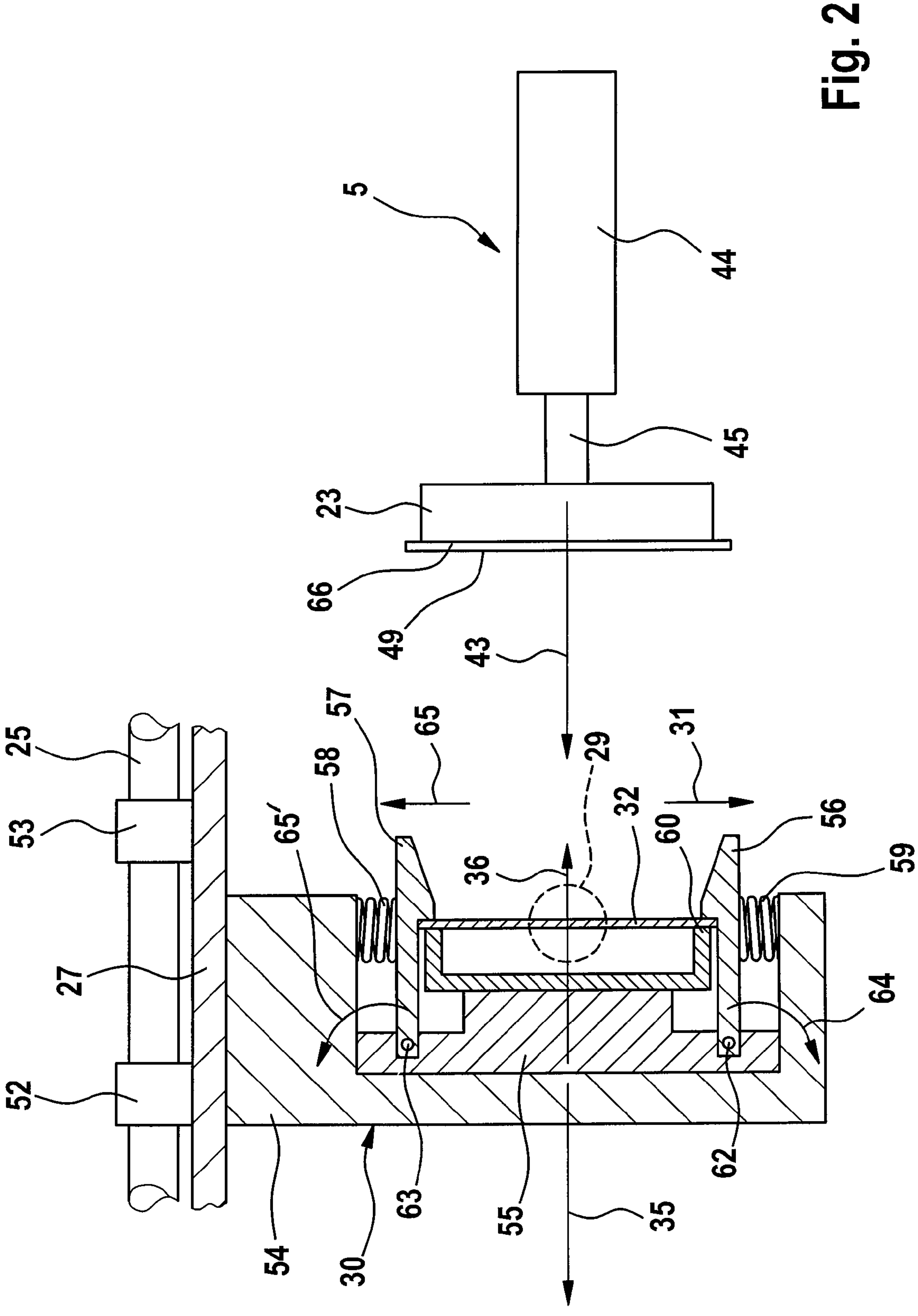
Figure 3:
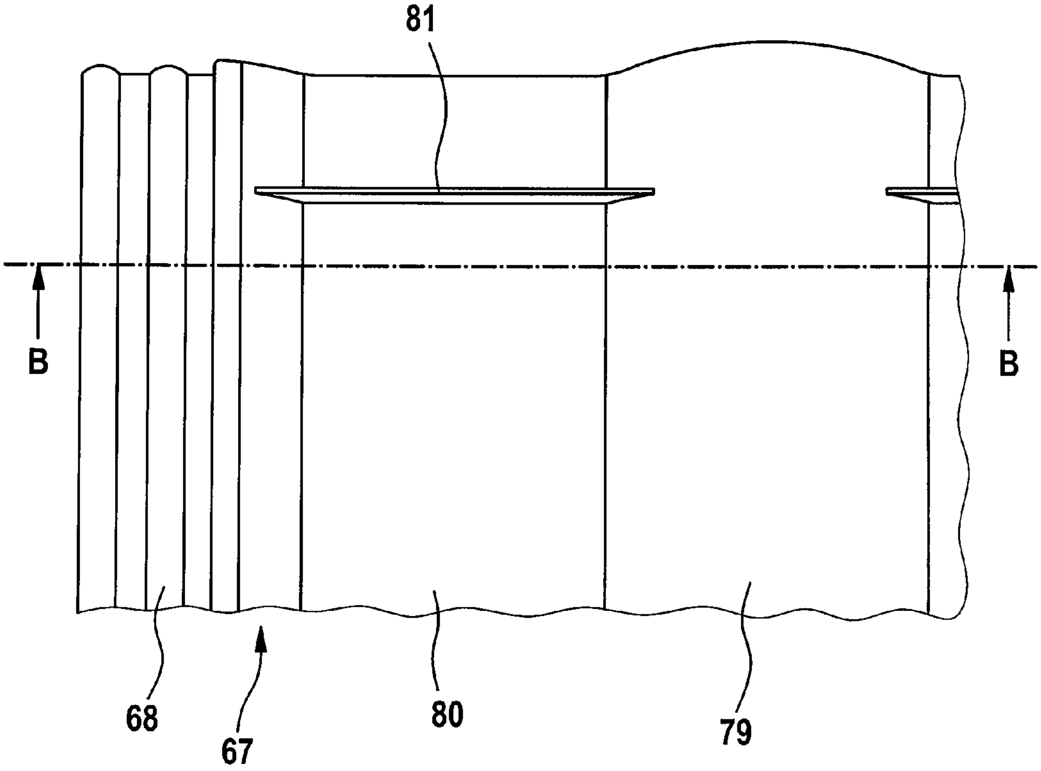
Figure 4:
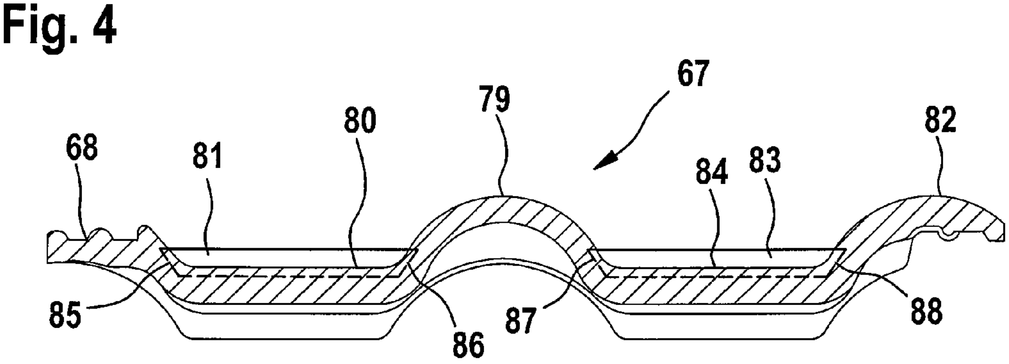

Embodiment examples of the invention are shown in the drawing and will be described in the following in further detail. In the drawing depict:

FIG. 1 an arrangement for inserting a water stop into a roof tile blank,

FIG. 2 a holding arrangement for a water stop with the opposing fitting arrangement according to a section A-A of FIG. 1, FIG. 3 a top view onto a partial region of a roof tile produced after the method according to the invention, FIG. 4 a roof tile with two water stops according to a section B-B of FIG. 3.

FIG. 1 shows an arrangement 1 for inserting at least one water stop into a roof tile. This arrangement 1 comprises a working station 2 with a setting arrangement 3, a loading arrangement 4 as well as a fitting arrangement 5. The loading arrangement 4 includes multiple water stops 8 to 9 disposed successively in a magazine 6. These water stops are small plates of a corrosion-resistant material, for example, stainless steel metal or synthetic materials as shown in further detail in FIGS. 3 and 4.

Evident are further conveying devices 10, 11, for example conveying belts 10, 11, on which roof tile blanks 12 to 14 are disposed on subforms 15 to 17.

Of the conveying device 11 and the subform 17 as well as of roof tile 14 only portions are evident. The conveying device 11 is a component of a roof tile machine not depicted in FIG. 1, which precedes the arrangement 1 according to the invention. The conveying device 10, on the other hand, belongs to arrangement 1 and includes pusher dogs 18, 19, which encompass the subforms 15 to 17. Each of the roof tile blanks 12 to 14 disposed on the subforms 15 to 17 and comprised of compacted green concrete have the same distance from one another.

The loading arrangement 4 serves for providing water stops 7 to 9 in the form of small plates for the fitting arrangement 5. For this purpose, water stop 7 previously disposed directly at an output slot 20 of magazine 6 is fed to the output slot 20 by means of a compressed air cylinder 70, which includes a pusher dog 73, and pushed out by means of a piston rod 21 of a cylinder 22. The water stop 7 is thereby transferred directly into the receiving arrangement 23 of the fitting arrangement 5, as is shown in FIG. 1. The manner of output of the water stops, consequently, is similar to the output of a staple from a staple magazine.

FIG. 1 shows further a sliding carriage 27, on which the setting arrangement 3 is fastened. This carriage 27 is located on rails 24, 25 extending parallel to one another.

The setting arrangement 3 further includes a compressed air cylinder 28 with a piston rod 29. Beneath the compressed air cylinder 28 with the piston rod 29 is located a holding arrangement 30 for a water stop 32.

In order to provide roof tile blanks 12 to 14 with water stops 7 to 9, first, the roof tile blanks 12 to 14 are cut, for example according to DE 35 22 846 A1 from an endless band of compacted green concrete, such that on each of the abutting subforms one roof tile blank comes to lie. In FIG. 1 the roof tile machine, with which the extrusion and profiling of the endless green concrete band as well as also the cutting of the same takes place, is only represented by its conveying device 11, which has a supporting wheel 61.

After the cutting has been completed, the subforms 15 to 17 are already separated from one another in the roof tile machine, such that each of the subforms 15 to 17 is equidistant from the other, with which distance they are also transferred onto the conveying device 10.

On the conveying device 10 the subform 16 with the roof tile blanks 13 disposed thereon is positioned form-fittingly by applying the pusher dog 19. A relative movement between subform 16 and conveying device 10 is thus prevented.

To provide the roof tile blank 12 with the water stop 32, this blank must assume a specific position beneath the setting arrangement 3. In FIG. 1 the roof tile blank 12 disposed on the subform 15 has assumed such a position. In order to insert into the roof tile blank 12 the water stop 32 disposed in the holding arrangement 30 of the setting arrangement 3 with the aid of the piston rod 29, the piston rod 29 is moved in the direction of arrow 33. The water stop 32 is herein pressed downwardly by the piston rod 29 and pressed into the compacted green concrete of the roof tile blank 12. The piston rod 29 is subsequently moved with the aid of the compressed air cylinder 28 again into the initial position, i.e. in the direction of arrow 34.

The process just described can also be referred to as "stationary" pressing-in of the water stop, since in this case the roof tile blank is stopped beneath the setting arrangement 3 and a continuous feed of roof tile blanks by means of the conveying device 10 is not required. This is, for example, possible if the arrangement 1 does not directly succeed the roof tile machine and the roof tile blanks, together with their subforms, are removed from the roof tile ring. However, as a rule, the arrangement 1 is integrated into the roof tile ring, such that the water stop is inserted during the transport of a roof tile blank in the direction of arrow 35.

If the roof tile blank 12 is moved in direction of arrow 35 during the insertion of water stop 32, it is necessary that the carriage 27 provided with the setting arrangement 3 is also moved parallel to the direction of movement of roof tile blank 12, i.e. also in the direction of arrow 35, and, after the water stop 32 has been inserted into the roof tile blank 12, is moved back again into the initial position, i.e. in the direction of arrow 36.

This is attained thereby that the carriage 27 is moved in the direction of arrow 35, while the compressed air cylinder 28 of setting arrangement 3 moves its piston rod 29 in the direction of arrow 33. With carriage 27 thus quasi the X-speed component of water stop 32 is generated, while the Y-speed component is generated by the compressed air cylinder 28 of setting arrangement 3.

In order for the water stop 32 to be pressed in the correct position into the roof tile blank 12, the two movements in the direction of arrows 35 and 33 are coupled with the movement of roof tile blank 12 in the direction of arrow 35. This can take place, for example, through a crank drive 37, which is here only shown schematically. Via its two crank arms 38, 39 this crank drive 37 connects a driving wheel 40 of conveying device 10 with the carriage 27 of the setting arrangement 3.

The driving wheel 40 of conveying device 10, for example of a chain or toothed belt conveying device, having also another wheel 46, is driven by the same motor, which however is not shown in FIG. 1, as the crank arm 39. The synchronization of the movement of the subform 15 with the movement of the setting arrangement 3 is such that the subform 15 at one rotation of the driving wheel 40 is conveyed by a segment corresponding to the length of subform 15 and to the particular distance between two subforms. Simultaneously, via the length of the crank arm 38 of crank drive 37 it is ensured that the setting arrangement 3 at the point in time of reaching the same speed as the subform 15 is located exactly at the desired position above the head-end margin 42 of roof tile blank 12. This ensures that the water stop 32 is positioned correctly in the watercourse of roof tile blank 12.

Carriage 27, on the other hand, with one rotation of the driving wheel 40 in the direction of arrow 41 along the rails 24, 25 carries out a reciprocating movement in the direction of arrows 35, 36. It is herein important that the carriage 27 moves the setting arrangement 3 at least intermittently at the same speed as the subforms 15 to 17 with the roof tile blanks 12 to 14 transported by conveying device 10. The compressed air cylinder 28 of setting arrangement 3 is actuated by a signal sender, not shown in FIG. 1, on the driving wheel 40, which signal sender triggers the movement of the piston rod 29 as soon as the speed of carriage 27 agrees with that of the roof tile blanks 12 to 14 and the relative position of setting arrangement 3 and roof tile blank 12 desired for pressing in the water stop 32 is reached. Only in this way is it possible to push the water stop 32 via the movement of the piston rod 29 into the roof tile blank 12 and again to guide back the piston rod 29 in direction 34 without the green concrete of the roof tile blank 12 being amassed.

Instead of a crank drive 37, matching the movement and speed of subform 15 and setting arrangement 3 can be attained, for example, via cam gears or servo drives, which, however, are not shown in FIG. 1. Control is, moreover, possible by means of a computer, which matches the movement and the speed of the setting arrangement 3 with the movement rate of the conveying device 10. Herein, information about the positions of roof tile blank and carriage can be transmitted to the computer via sensors.

After the water stop 32 has been implanted into the roof tile blank 12, the holding arrangement 30 of the setting arrangement 3 must be provided with a new water stop 8.

This takes place thereby that the water stop 8 is pressed out of the magazine 6 over the output slot 20 by means of the piston rod 21 of the compressed air cylinder 22.

The water stop 8 is herein transferred into the receiving arrangement 23 of the fitting arrangement 5. The fitting arrangement 5 and the holding arrangement 30 are located in one and the same plane 26, such that the holding arrangement 30 can be fitted with the water stop 8 through a movement of the receiving arrangement 23 taking place in the direction of arrow 35, i.e. in the direction toward the holding arrangement 30.

Since the fitting of the holding arrangement 30 can only take place when the carriage 27 with the setting arrangement 3 is in the initial position, the movement of the setting arrangement 3 must also be matched with the movement of the fitting arrangement 5. This can take place, for example, through a computer which matches the movements to one another. Such a computer, which processes the signals from position sensors, is, however, not shown in FIG. 1.

To ensure a continuous production process, new water stops must continuously be fed to the output slot 20 of magazine 6. For this purpose, a compressed air cylinder 70 is provided, which moves the water stops located in the magazine 6, which is open at the top, by means of a pusher dog 73 to the left in the direction toward the output slot 20. As soon as the supply of water stops in the magazine 6 starts to run out, the compressed air cylinder 70 with its pusher dog 73 is moved upwardly, and the water stops located in the upwardly open magazine 72 are moved to the left by means of a pusher dog 74 of another compressed air cylinder 69, where they assume the position of the previous water stops 7 to 9.

The arrangement 1 depicted in FIG. 1 is integrated into the roof tile ring and located directly behind the roof tile machine, such that the roof tile blanks are supplied continuously and at a clock rate of 120 roof tile blanks per minute.

In FIG. 1 the method according to the invention is only exemplified when pressing in a water stop. As FIGS. 3 and 4 show, a roof tile 67 comprises, however, most often two parallel watercourses 80, 84, which are provided with water stops 81, 83. The arrangement 1 can therefore have two identical holders 30 for water stops, which are disposed next to one another and corresponding to the distance of the watercourses 80, 84. In this case the setting arrangement 3 may comprise a compressed air cylinder 28 whose piston rod 29 is bifurcated, such that it can press two water stops 81, 83 simultaneously into the roof tile blank in one setting process.

FIG. 2 shows the fitting arrangement 5 as well as the holding arrangement 30 according to FIG. 1 in an enlarged illustration in a section A-A through carriage 27 and piston rod 29. Further details of the setting arrangement 3 are not shown for the sake of clarity.

The fitting arrangement 5 comprises a compressed air cylinder 44 with the receiving arrangement 23. The compressed air cylinder 44 is connected with the receiving arrangement 23 via a piston rod 45. A water stop 49 is already located in the receiving arrangement 23, which includes, for example, a magnet 66 with which a metallic water stop 49 is held.

Evident is also the holding arrangement 30 which is connected with the carriage 27 of the setting arrangement 3. Carriage 27 includes two guide sleeves 52, 53 through which the rail 25 is guided. The carriage 27 can thereby be moved together with the holding arrangement 30 along the rail 25 in the direction of arrows 35 and 36, alternatively.

Holding arrangement 30 comprises a main block 54 provided with a U-shaped recess into which is set a securement arrangement 55. On the securement arrangement 55 are located two movable holding arms 56, 57, which are disposed rotatably on the securement arrangement 55 by means of connection elements 62, 63, for example screws, rivets or bolts. The holding arms 56, 57 are articulated by means of elastic structural elements on the lateral wall of the U-shaped recess, the holding arm 57 being held by a spring 58 and the holding arm 56 by a spring 59. Seen is further a substantially U-shaped support 60, which is disposed on the securement arrangement 55 and between the inner sides of the two holding arms 56, 57. On the free ends of the U-shaped support 60 is placed a water stop 32, over which extend the holding arms 56, 57 and by which holding arms the stop is pressed on.

After the water stop 32 has been pressed into a roof tile blank, i.e. after it has been removed from the holding arrangement 30 by means of piston rod 29, it is necessary to introduce into the holding arrangement 30 a further water stop in order for the stop to be pressed subsequently into a new roof tile blank. This must take place in such manner that the continuous process is not interrupted.

For this purpose the receiving arrangement 23 of the fitting arrangement 5 provided with the water stop 49 is moved by means of the compressed air cylinder 44 and the piston rod 45 in the direction toward the holding arrangement 30, i.e. in the direction of arrow 43.

As soon as the water stop 49 has reached the holding arms 56 and 57, it spreads apart laterally with its lateral margins the holding arms 56 and 57 against the force of springs 58, 59 in the direction of arrows 31 and 64, and in the direction of arrows 65 and 65', respectively.

The water stop 49 is herein pressed by the receiving arrangement 23 onto the U-shaped support 60 and firmly held by the holding arms 56, 57 which extend over the lateral margins of water stop 49 and snap in, such that water stop 49 remains in the holding arrangement 30 when the receiving arrangement 23 is moved back again into its initial position.

Instead of the above described mechanical fixing of the water stop, the U-shaped support 60 may include a magnet which pulls the small plate-shaped water stop, which in this case is preferably comprised of a magnetizable material, away from the receiving arrangement 23 toward support 60 magnet. Should the receiving arrangement 23 also include a magnet which holds the water stop, it is necessary for the magnet of support 60 to be stronger than the magnet of the receiving arrangement 23.

It is also feasible to fit out the U-shaped support 60 as well as the receiving arrangement 23 with electromagnets. The electromagnet, which is located in the receiving arrangement 23, is switched off as soon as the water stop 49 comes to lie on the U-shaped support. In contrast, the electromagnet in support 60 is switched on, such that the water stop 49 is moved into the holding arrangement 30 and remains here. If the water stop 49 is subsequently located in the holding arrangement 30, the receiving arrangement 23 is brought again into the original position and fitted with a new water stop.

In the position of water stop 32 depicted in FIG. 2 the piston rod 29, only indicated in dashed lines, is moved into the plane of drawing, such that it presses the water stop 32 into the roof tile blank.

It is understood that, instead of said piston rods and compressed air cylinders, other driving means can also be selected as the driving means.

FIG. 3 shows a segment of a roof tile 67 produced according to the invention in top view. This roof tile 67 comprises a lateral water beading 68 as well as a central brim 79, between which a watercourse 80 is located. In this watercourse 80 a water stop 81 is disposed between the central brim 79 and the lateral water beading 68.

FIG. 4 shows a cross section B-B through the roof tile 67 according to FIG. 3, wherein now also the lateral cover beading 82 can be seen. Between this cover beading 82 and the central brim 79 is disposed a further water stop 83. This water stop is also a thin and elastic small plate.

The water stops 81, 83 have the form of a trapezoid, the lower sides of the trapezoid being pressed into the watercourses 80, 84. The oblique lateral edges 85, 86, 87, 88 of water stops 81, 83 engage into the water beading 68 and the cover beading 82, respectively, and into the central brim 79.

The long sides of the trapezoids are substantially exposed. Through the trapezoidal implementation of the water stops 81, 83 their penetration into the green concrete is facilitated. The water stops are here adapted to the particular profile of the roof tile blanks.

The arrangement according to the invention has been described in conjunction with the fitting of a roof tile blank. However, in principle, the arrangement is also applicable with a cured roof tile, if, for example, a slit is millcut into the roof tile before the water stop is set in. The millcutting of such a slit could take place, for example, with a controllable laser beam. The water stop could in this case be implemented in the form of a wedge in order to attain a clamping action between the slit and the water stop.

The invention claimed is:

1. Arrangement for producing a roof tile with at least one water stop, comprising a) a magazine for water stops, said magazine being arranged generally horizontally and comprising a plurality of water stops which are arranged one after another in a generally horizontal direction;

b) a movable fitting arrangement for the transport of water stops generally horizontally in the direction of a setting arrangement, said fitting arrangement being located below said magazine and being supplied with water stops from said magazine, whereby c) the setting arrangement comprises a holding arrangement for water stops and a movable piston rod, said piston rod being movable in a direction generally transverse to the movement of the fitting arrangement.

2. Arrangement as claimed in claim 1, characterized in that the water stops have the form of small plates.

3. Arrangement as claimed in claim 1, characterized in that the setting arrangement generates a relative movement between the water stop and a roof tile blank.

4. Arrangement as claimed in claim 1, characterized in that the piston rod moves in a plane which is directed toward the surface of the roof tile.

5. Arrangement as claimed in claim 1, characterized in that the piston rod is located in a plane which faces an edge of the water stop.

6. Arrangement as claimed in claim 1, characterized in that the fitting arrangement fits the holding arrangement with small plate-shaped water stops.

7. Arrangement as claimed in claim 1, characterized in that an infeed mechanism is provided which feeds the water stops to an output slot of the magazine.

8. Arrangement as claimed in claim 1, characterized in that a loading arrangement is provided which feeds small plate-shaped water stops to the fitting arrangement.

9. Arrangement as claimed in claim 1, characterized in that for the transfer of a water stop the fitting arrangement and the holding arrangement are disposed such that they are movable and located in one and the same plane.

10. Arrangement as claimed in claim 1, characterized in that the roof tile or the roof tile blank is located on a subform.

11. Arrangement as claimed in claim 10, characterized in that the subform is encompassed by at least one pusher dog.

12. Arrangement as claimed in claim 1, characterized in that for holding the small plate-shaped water stop the holding arrangement comprises movable holding arms.

13. Arrangement as claimed in claim 12, characterized in that the holding arms are movably connected with a securement arrangement.

14. Arrangement as claimed in claim 13, characterized in that on the securement arrangement a support is provided which is at least partially encompassed by the holding arms.

15. Arrangement as claimed in claim 12, characterized in that springs are provided between the holding arms and a main block.

16. Arrangement as claimed in claim 14, characterized in that the support is provided with a magnet.

17. Arrangement as claimed in claim 2, characterized in that a conveying device for roof tile blanks is provided whose conveying direction extends perpendicularly to the relative movement between the water stop and the roof tile blanks.

18. Arrangement as claimed in claim 1, characterized in that the setting arrangement is disposed on a carriage, in which a rail is suspended extending parallel to the surface of the conveying device.

19. Arrangement as claimed in claim 18, characterized in that a driving means is provided which reciprocatingly moves the carriage.

20. Arrangement as claimed in claim 19, characterized in that the conveying movement of the roof tile blanks is synchronized with the reciprocating movement of the carriage, such that this carriage moves at least partially at a speed which corresponds to the conveying speed of the roof tiles or roof tile blanks.

21. Arrangement as claimed in claim 20, characterized in that a signal sender is provided, which triggers the relative movement as soon as the carriage moves at the same speed as the roof tile blank and the roof tile blank has reached the position beneath the setting arrangement desired for setting the water stop.

22. Method for the production of a roof tile with at least one water stop, comprising the following steps:

a) fitting a setting arrangement with a small plate-shaped water stop by means of a movable fitting arrangement which transports said water stop generally horizontally in the direction of the setting arrangement, b) providing a roof tile blank beneath the setting arrangement, c) moving the small plate-shaped water stop via the setting arrangement in the direction toward the surface of the roof tile blank and generally transverse to the movement of the fitting arrangement and, d) pressing the water stop into the roof tile blank.

23. Method as claimed in claim 22, characterized in that the water stop is moved with the aid of a reciprocatingly movable piston rod of the setting arrangement.

24. Method as claimed in claim 23, characterized in that the water stop is removed from a holding arrangement with the aid of the piston rod.

25. Method as claimed in one of claim 22, characterized in that the holding arrangement, after the water stop has been pressed into the roof tile blank, is fitted with a new water stop.

26. Method as claimed in claim 25, characterized in that for the fitting at least one fitting arrangement is moved to the holding arrangement.

27. Method as claimed in claim 22, characterized in that the fitting arrangement is loaded with a new water stop after the transfer of the water stop.

28. Method as claimed in claim 27, characterized in that the water stop is removed from a magazine by means of a loading arrangement and fed to the fitting arrangement.

29. Method as claimed in claim 28, characterized in that the water stops stored in the magazine are fed to an output slot.

30. Method as claimed in claim 22, characterized in that the roof tile blank is transported by means of a conveying device under the setting arrangement.

31. Method as claimed in claim 30, characterized in that the setting arrangement is reciprocatingly moved substantially parallel to the conveying movement of the roof tile blank.

32. Method as claimed in claim 31, characterized in that the reciprocating movement of the setting arrangement takes place at least partially at a speed corresponding to the conveying speed of the roof tile blanks.

33. Method as claimed in claim 32, characterized in that the reciprocating movement of the piston rod is triggered as soon as the setting arrangement moves at the same speed as the roof tile blank and has reached the position above the roof tile blank desired for setting the water stop.

* * * * *